(12) United States Patent
Plesko

(10) Patent No.: US 8,294,969 B2
(45) Date of Patent: Oct. 23, 2012

(54) SCAN ELEMENT FOR USE IN SCANNING LIGHT AND METHOD OF MAKING THE SAME

(75) Inventor: George A. Plesko, Chadds Ford, PA (US)

(73) Assignee: Metrologic Instruments, Inc., Blackwood, NJ (US)

(*) Notice: Subject to any disclaimer, the term of this patent is extended or adjusted under 35 U.S.C. 154(b) by 21 days.

(21) Appl. No.: 12/565,014

(22) Filed: Sep. 23, 2009

(65) Prior Publication Data

US 2011/0069364 A1 Mar. 24, 2011

(51) Int. Cl.
*G02B 26/08* (2006.01)

(52) U.S. Cl. ................. 359/200.7; 359/199.3; 359/224.1

(58) Field of Classification Search .... 359/198.1–199.1, 359/199.3, 200.7, 224.1–224.2
See application file for complete search history.

(56) References Cited

U.S. PATENT DOCUMENTS

| | | |
|---|---|---|
| 3,642,344 A | 2/1972 | Corker |
| 4,034,230 A | 7/1977 | Brill |
| 4,251,798 A | 2/1981 | Swartz et al. |
| 4,286,145 A | 8/1981 | Palmer |
| 4,805,175 A | 2/1989 | Knowles |
| 5,003,164 A | 3/1991 | Barkan |
| 5,015,831 A | 5/1991 | Eastman |
| 5,019,764 A | 5/1991 | Chang |
| 5,059,779 A | 10/1991 | Krichever et al. |
| 5,099,110 A | 3/1992 | Shepard |
| 5,115,120 A | 5/1992 | Eastman |
| 5,126,545 A | 6/1992 | Barkan |
| 5,168,149 A | 12/1992 | Dvorkis |
| 5,200,597 A | 4/1993 | Eastman |
| 5,206,492 A | 4/1993 | Shepard |
| 5,252,816 A | 10/1993 | Onimaru |
| 5,258,699 A | 11/1993 | Grodevant |
| 5,262,627 A | 11/1993 | Shepard |
| 5,280,163 A | 1/1994 | Barkan |
| 5,280,165 A | 1/1994 | Dvorkis |
| 5,281,801 A | 1/1994 | Shepard |
| 5,329,103 A | 7/1994 | Rando |
| 5,367,151 A | 11/1994 | Dvorkis |
| 5,412,198 A | 5/1995 | Dvorkis |
| 5,420,411 A | 5/1995 | Salatto, Jr. |
| 5,422,469 A | 6/1995 | Bard et al. |

(Continued)

OTHER PUBLICATIONS

U.S. Appl. No. 5,637,857 (withdrawn).

(Continued)

*Primary Examiner* — James Phan
(74) *Attorney, Agent, or Firm* — Thomas J. Perkowski, Esq., P.C.

(57) ABSTRACT

A scan element includes a bobbin having a central axis about which is wound an electromagnetic wire coil and having a flange oriented generally transverse to the central axis. At least one elastomeric support has a first end coupled to the flange. A permanent magnet has first and second surfaces, a central axis, and a magnetization direction oriented generally transverse to the central axis of the permanent magnet. The magnet is supported by a second end of the elastomeric support. A mirror has a central axis and is mounted on the second surface of the magnet. The central axes of the mirror and magnet are coaxial with the central axis of the bobbin. The elastomeric support provides a return force when the magnet and the mirror are rotated at an angle from the central axis during energization of the electromagnetic wire coil.

19 Claims, 6 Drawing Sheets

U.S. PATENT DOCUMENTS

| | | | |
|---|---|---|---|
| 5,422,471 A | 6/1995 | Plesko |
| 5,422,472 A | 6/1995 | Zavislan |
| 5,464,976 A | 11/1995 | Scofield |
| 5,475,206 A | 12/1995 | Reddersen |
| 5,479,000 A | 12/1995 | Dvorkis |
| 5,484,995 A | 1/1996 | Scofield |
| 5,486,944 A | 1/1996 | Bard |
| 5,506,394 A | 4/1996 | Plesko |
| 5,508,503 A | 4/1996 | Scofield |
| 5,512,744 A | 4/1996 | Scofield |
| 5,532,468 A | 7/1996 | Scofield |
| 5,532,480 A | 7/1996 | Scofield |
| 5,539,192 A | 7/1996 | Scofield |
| 5,543,609 A | 8/1996 | Giordano |
| 5,559,319 A | 9/1996 | Peng |
| 5,576,531 A | 11/1996 | Murphy |
| 5,581,067 A | 12/1996 | Grosfeld et al. |
| 5,581,070 A | 12/1996 | Dvorkis |
| 5,583,332 A | 12/1996 | Krichever et al. |
| 5,589,679 A | 12/1996 | Dvorkis et al. |
| 5,594,232 A | 1/1997 | Giordano |
| 5,596,446 A | 1/1997 | Plesko |
| 5,598,070 A | 1/1997 | Coleman |
| 5,600,120 A | 2/1997 | Peng |
| 5,614,706 A | 3/1997 | Bard et al. |
| 5,621,371 A | 4/1997 | Dvorkis |
| 5,625,483 A | 4/1997 | Swartz |
| 5,629,510 A | 5/1997 | Quinn |
| 5,637,856 A | 6/1997 | Bridgelall |
| 5,648,649 A | 7/1997 | Bridgelall |
| 5,668,362 A | 9/1997 | Plesko |
| 5,682,029 A | 10/1997 | Dvorkis |
| 5,693,929 A | 12/1997 | Dvorkis et al. |
| 5,698,835 A | 12/1997 | Dvorkis |
| 5,705,799 A | 1/1998 | Li |
| 5,712,471 A | 1/1998 | Bremer |
| 5,714,750 A | 2/1998 | Eastman |
| 5,723,851 A | 3/1998 | Salatto, Jr. |
| 5,750,976 A | 5/1998 | Eastman |
| 5,763,863 A | 6/1998 | Grosfeld |
| 5,764,398 A | 6/1998 | Hayakawa |
| 5,786,585 A | 7/1998 | Eastman |
| 5,796,222 A | 8/1998 | Grodevant |
| 5,804,809 A | 9/1998 | Eastman |
| 5,821,521 A | 10/1998 | Bridgelall et al. |
| 5,825,013 A | 10/1998 | Dvorkis |
| 5,866,894 A | 2/1999 | Bard |
| 5,874,720 A | 2/1999 | Dvorkis |
| 5,880,452 A | 3/1999 | Plesko |
| 5,917,173 A | 6/1999 | Dvorkis |
| 5,923,025 A | 7/1999 | Dvorkis |
| 5,932,860 A | 8/1999 | Plesko |
| 5,945,658 A | 8/1999 | Salatto, Jr. |
| 5,945,659 A | 8/1999 | Dvorkis |
| 5,955,720 A | 9/1999 | He et al. |
| 5,984,188 A | 11/1999 | Dvorkis |
| 6,056,200 A | 5/2000 | Dvorkis |
| 6,059,188 A | 5/2000 | Difazio |
| 6,102,294 A | 8/2000 | Swartz |
| 6,114,712 A | 9/2000 | Dvorkis |
| 6,129,282 A | 10/2000 | Reddersen |
| 6,142,379 A | 11/2000 | Bard |
| 6,149,061 A | 11/2000 | Massieu |
| 6,152,372 A | 11/2000 | Colley |
| 6,173,895 B1 | 1/2001 | Plesko |
| 6,206,290 B1 | 3/2001 | Giebel |
| 6,227,450 B1 | 5/2001 | Blake et al. |
| 6,230,976 B1 | 5/2001 | Sautter |
| 6,283,372 B1 | 9/2001 | Li |
| 6,303,927 B1 | 10/2001 | Ahten |
| 6,325,288 B1 | 12/2001 | Spitz |
| 6,328,216 B1 | 12/2001 | Colley |
| 6,332,576 B1 | 12/2001 | Colley |
| 6,334,573 B1 | 1/2002 | Li |
| 6,347,744 B1 | 2/2002 | Metlitsky |
| 6,348,773 B1 | 2/2002 | Dvorkis et al. |
| 6,360,949 B1 | 3/2002 | Shepard |
| 6,390,370 B1 | 5/2002 | Plesko |
| 6,439,461 B2 | 8/2002 | Dvorkis |
| 6,491,222 B1 | 12/2002 | Dvorkis |
| 6,527,180 B1 | 3/2003 | Dvorkis |
| 6,527,183 B2 | 3/2003 | Bard |
| 6,575,370 B1 | 6/2003 | Dvorkis et al. |
| 6,585,160 B2 | 7/2003 | Dvorkis |
| 6,592,040 B2 | 7/2003 | Barkan et al. |
| 6,607,132 B1 | 8/2003 | Dvorkis et al. |
| 6,612,192 B2 | 9/2003 | Hardy |
| 6,612,496 B1 | 9/2003 | Barkan et al. |
| 6,621,070 B2 | 9/2003 | Ahten |
| 6,641,043 B1 | 11/2003 | Plesko |
| 6,648,227 B2 | 11/2003 | Swartz et al. |
| 6,712,270 B2 | 3/2004 | Leach |
| 6,715,681 B2 | 4/2004 | Dvorkis |
| 6,722,566 B1 | 4/2004 | Drzymala |
| 6,729,545 B2 | 5/2004 | Li |
| 6,769,616 B2 | 8/2004 | Kuo |
| 6,775,077 B1 | 8/2004 | Feng |
| 6,817,529 B2 | 11/2004 | Barkan et al. |
| 6,874,689 B2 | 4/2005 | Blake et al. |
| 6,884,993 B2 | 4/2005 | Ahten |
| 6,929,184 B2 | 8/2005 | Barkan |
| 6,932,274 B2 | 8/2005 | Dvorkis |
| 6,969,005 B2 | 11/2005 | Otsubo |
| 6,970,275 B2 * | 11/2005 | Cannon et al. ............. 359/213.1 |
| 7,034,370 B2 | 4/2006 | Kuo |
| 7,059,528 B2 | 6/2006 | Barkan |
| 7,071,931 B2 | 7/2006 | Tegreene |
| 7,182,262 B2 | 2/2007 | Wood |
| 7,204,424 B2 | 4/2007 | Yavid |
| 7,207,489 B2 | 4/2007 | Drzymala et al. |
| 7,246,375 B1 | 7/2007 | Jean et al. |
| 7,281,658 B2 | 10/2007 | Shepard |
| 7,296,750 B2 | 11/2007 | Wood |
| 7,306,154 B2 | 12/2007 | Takahashi |
| 7,325,736 B2 | 2/2008 | Asai |
| 7,387,248 B2 | 6/2008 | Drzymala et al. |
| 7,416,126 B2 | 8/2008 | Wittenberg et al. |
| 7,614,561 B2 | 11/2009 | Blake et al. |
| 7,710,627 B2 * | 5/2010 | Yoon et al. ................. 359/224.1 |
| 8,059,324 B2 | 11/2011 | Edmonds |
| 2006/0169780 A1 | 8/2006 | Drzymala et al. |

OTHER PUBLICATIONS

Oliveira et al., "Dynamic Analysis of Silicon Micromachined Double-Rotor Scanning Minor", Journal of Brazilian Society of Mechanical Science and Engineering, Oct.-Dec. 2006, vol. XXVIII, No. 4/443.

* cited by examiner

SCAN ELEMENT FOR USE IN SCANNING LIGHT AND METHOD OF MAKING THE SAME

BACKGROUND OF THE INVENTION

An embodiment of the present invention relates generally to a light beam scanning element, and more particularly, to a light beam scanning element having at least one elastomeric support, and methods of manufacturing the same.

In laser-based barcode scanning equipment, and particularly in portable laser-based barcode scanning equipment, a scan component is used to dither a mirror. The moving mirror is used to sweep a laser beam across a barcode target to be read. This component is often called a scan element. A scan element is a critical moving component in portable laser-based barcode readers. Desirable attributes for a scan element are small size, ruggedness, energy efficiency, freedom from beam shifting when held in different orientations, and immunity to unwanted motions of the scan beam when held by an operator.

Conventional hinge-based scan elements are formed from cantilevered beams of plastic film or other flexible materials and are not balanced structures. Several such scan elements are described in U.S. Pat. No. 6,173,895, which suffer from unwanted tilting or drooping of the scan mirror when held in different orientations due to the effects of gravity, especially if the scan mirror and moving magnet are large. Further, flexible film hinges can become permanently distorted if the device is dropped or otherwise exposed to rough handling. Such distortion produces shifted scan lines or scan lines that are no longer straight. Shaft-based scan elements, such as described in U.S. Pat. No. 7,420,721 B2, are also prone to wobble of the scan mirror induced by gravity or operator movement when used in portable hand held applications. The above-described drawbacks are exacerbated by the use of large scan mirrors required for long range scanning.

Beam shifting may also be caused by the addition of an inductive pole piece within the electromagnetic drive coil, (see, e.g., U.S. Pat. No. 7,420,721 B2). The pole piece generates a magnetic bias that can tilt the scan mirror or cause unwanted forces, which result in undesirable speed perturbations of the scan line. Thus, tedious adjustment is needed to ensure proper operation of the scan element, and may be subject to error. It is therefore desirable to provide a compact scan element that exhibits a high degree of immunity to irregular scan speed, beam shifting, unwanted tilting, misalignment, drooping, and damage.

Further drawbacks associated with conventional scan elements are radical bursts of acceleration and deceleration of the scan mirror, which distort the timing of light signals reflected from a barcode target. Distortion often occurs when a pulse of current, such as a short duty cycle square wave, is used as a drive waveform, especially at non-resonant frequencies. It is therefore desirable to have the scan element respond faithfully to a shaped drive signal, such as a triangle or sinusoidal waveform, to provide a non-jerky scan speed characteristic. It is further desirable to provide a scan mechanism that can be driven over a range of speeds below resonance at low power and controlled under the constant influence of current in a drive coil having no pole piece.

BRIEF SUMMARY OF THE INVENTION

Briefly stated, the present invention is directed to a scan element for use in scanning light from a light source. The scan element includes a bobbin having a central axis about which is wound an energizable electromagnetic wire coil. The bobbin includes a flange oriented generally transverse to the central axis of the bobbin. At least one elastomeric support has first and second ends. The first end is coupled to the flange of the bobbin. A permanent magnet has first and second surfaces, a central axis, and a magnetization direction. The first surface of the permanent magnet is supported by the second end of the at least one elastomeric support. The central axis of the permanent magnet is coaxial with the central axis of the bobbin. The magnetization direction is oriented generally transverse to the central axis of the permanent magnet. A mirror has a central axis and is mounted on the second surface of the permanent magnet. The central axis of the mirror is coaxial with the central axes of the bobbin and the permanent magnet. The at least one elastomeric support provides a return force when the permanent magnet and the mirror are rotated at an angle from the central axis during energization of the electromagnetic wire coil.

In another aspect, the present invention is directed to a scan element for use in scanning light from a light source. The scan element includes a bobbin having a central axis about which is wound an energizable electromagnetic wire coil. The bobbin includes a flange oriented generally transverse to the central axis of the bobbin. An elastomeric support has first and second ends. The first end is coupled to the flange of the bobbin. A permanent magnet has a central axis and a magnetization direction. The magnet is embedded within the elastomeric support adjacent to the second end of the elastomeric support. The central axis of the permanent magnet is generally coaxial with the central axis of the bobbin. The magnetization direction is oriented generally transverse to the central axis of the permanent magnet. A mirror has a central axis and is mounted on the second end of the elastomeric support. The central axis of the mirror is generally coaxial with the central axes of the bobbin and the permanent magnet. The elastomeric support provides a return force when the permanent magnet and the mirror are rotated at an angle from the central axis during energization of the electromagnetic wire coil.

In yet another aspect, the present invention is directed to a method of forming an elastomeric support for a scan element. The method includes providing a bobbin having a flange. The flange has a surface with at least one pocket formed therein. A predetermined amount of a molding material is placed in the at least one pocket. An exposed surface of the molding material is located a distance from the surface of the flange. A first surface of a substrate is placed in contact with the exposed surface of the molding material. The flange and the substrate are separated by a predetermined distance after the molding material adheres to the first surface of the substrate. At least one of a magnet and a mirror is placed on a second surface of the substrate.

In still another aspect, the present invention is directed to a method of forming an elastomeric support for a scan element. A bobbin is provided having a flange. The flange has a surface with at least one pocket formed therein. A substrate is provided having at least one hole formed therein. A first predetermined amount of a molding material is placed in the at least one pocket. A first surface of a substrate is placed in contact with the surface of the flange such that the at least one hole in the substrate overlays the at least one pocket in the flange. A second predetermined amount of the molding material is placed in the at least one pocket such that the molding material covers a portion of a second surface of the substrate. The flange and the substrate are separated by a predetermined distance. At least one of a magnet and a mirror is placed on the second surface of the substrate.

In yet another aspect, the present invention is directed to a method of forming an elastomeric support for a scan element. The method includes providing a bobbin having a flange. The flange has a generally flat surface. An elastomeric support is formed having first and second ends. The first end is coupled to the surface of the flange. A magnet is embedded within the elastomeric support adjacent the first end. A mirror is mounted to the second end of the elastomeric support.

BRIEF DESCRIPTION OF THE DRAWINGS

The foregoing summary, as well as the following detailed description of preferred embodiments of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

DETAILED DESCRIPTION OF THE INVENTION

Figure 1:
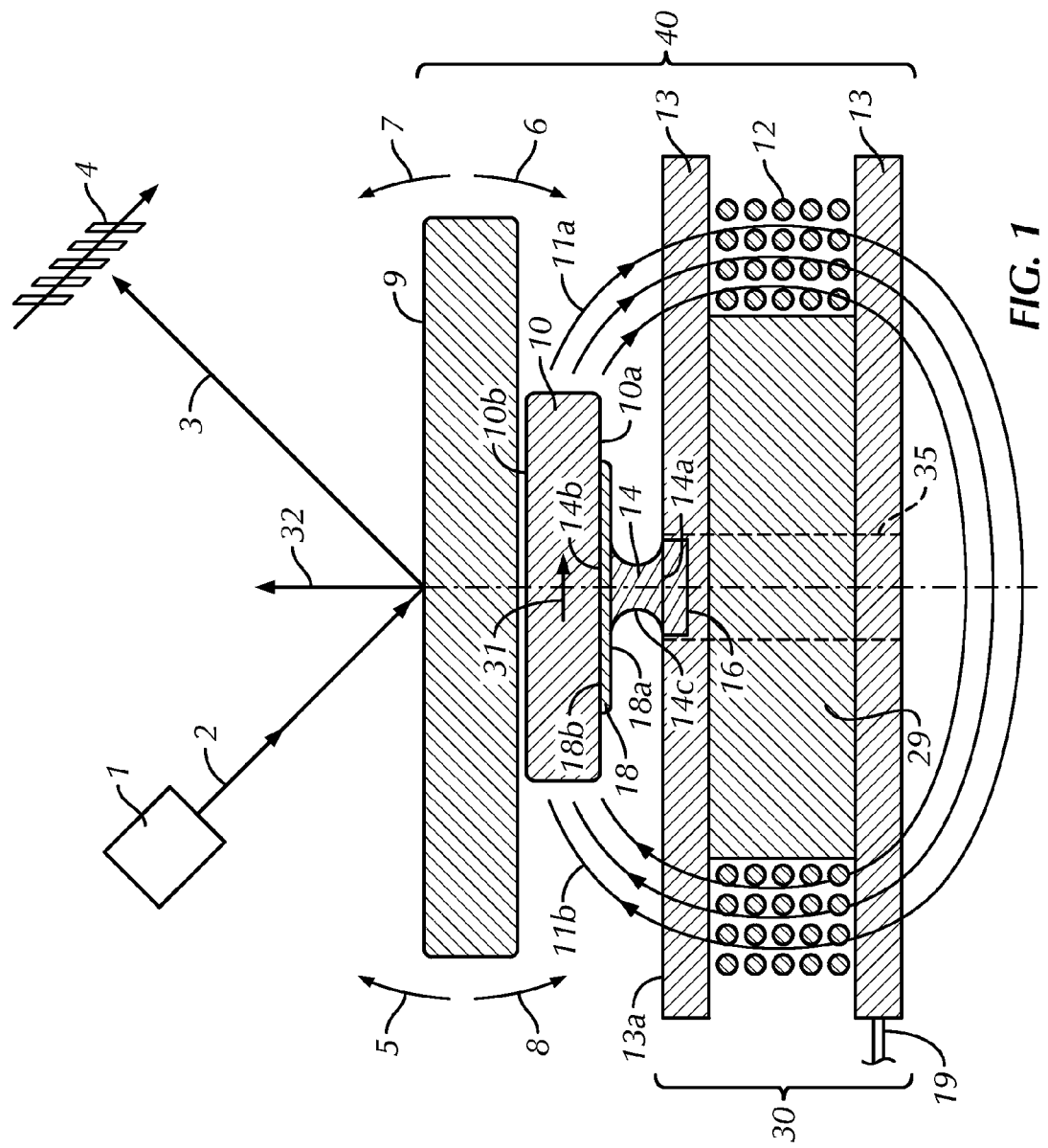
FIG. 1 is a side elevational cross-sectional view of a scan element in accordance with one preferred embodiment of the present invention.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the scan element and designated parts thereof. The terminology includes the above-listed words, derivatives thereof, and words of similar import. Additionally, the words "a" and "an," as used in the claims and in the corresponding portions of the specification, mean "at least one."

Referring to the drawings in detail, wherein the same reference numerals indicate like elements throughout, there is shown in FIG. 1 a preferred embodiment of a scan element 40. The scan element 40 preferably includes a bobbin 30 with a cylindrical core 29 and at least one, and preferably two, flanges 13 located at longitudinal ends thereof. The flanges 13 preferably radially extend beyond a circumference of the core 29. The bobbin 30 includes a central axis 32 and a wire coil 12 is wound around the bobbin 30, preferably around the core 29, about the central axis 32. Input terminals 19 may be provided to introduce current into the wire coil 12, although ends of the wire coil 12 may also be directly connected to a current source (not shown). The bobbin 30 is preferably molded of a non-magnetic material, such as plastic, but may also be manufactured from nylon or other high strength light weight non-magnetic materials. The bobbin 30 may also be assembled from separate components.

One of the flanges 13 includes an upper exposed generally flat surface 13a with at least one pocket 16 formed therein. The pocket 16 is preferably molded into the surface 13a of the flange 13, but may also be cut out of the surface 13a. In the preferred embodiment, the flange 13 preferably includes two pockets 16, but more than two pockets is within the spirit and scope of the invention. An elastomeric support 14 having first and second ends 14a, 14b and an intermediate portion 14c extends from the flange 13. More particularly, the first end 14a of the elastomeric support 14 is firmly anchored within the pocket 16.

The elastomeric support 14 is preferably formed from rubber material, and more preferably from a silicone rubber, for example a liquid silicone room temperature vulcanizing (RTV) resin or injection moldable silicone rubber, by a process described below. Alternatively, the elastomeric support 14 could be constructed of saturated or unsaturated rubbers, thermoplastic elastomers, or any other flexible or elastic material. The first and second ends 14a, 14b of the elastomeric support 14 preferably have cross-sectional areas larger than the intermediate portion 14c. When the elastomeric support 14 flexes, the thinner intermediate portion 14c helps to distribute internal stresses so that bonds at the first and second ends 14a, 14b are not over-stressed. The elastomeric support 14 also produces a return force when flexed from a central position illustrated in FIG. 1. The elastomeric support 14, particularly formed with silicone rubber, is therefore rugged, durable, and will not vary appreciably in its flexural properties when exposed to temperatures and other environmental conditions encountered in portable barcode reading applications.

The second end 14b of the elastomeric support 14 is bonded to a first surface 18a of a substrate 18. The substrate 18 is preferably formed from a non-magnetic material, such as a non-ferrous metal or suitable plastic. A second surface 18b of the substrate 18 is bonded to a first surface 10a of a permanent magnet 10. It should be noted that although the substrate 18 is provided as a convenient mounting surface, particularly when utilizing liquid RTV silicone in formation of the elastomeric support 14, and as a locating aid for accurate placement of the magnet 10, the substrate is not required for proper operation of the scan element 40. The elastomeric support 14 may be directly attached to the magnet 10 using appropriate bonding agents, adhesive promoting primers, and the like.

For purposes of illustration, arrow 31 indicates a direction of magnetization of the magnet 10 with respect to the elastomeric support(s) 14, coil 12, and desired direction of dithering for mirror 9 (indicated by arrows 5, 6, 7, 8). However, the magnetization direction may be adjusted to suit the desired oscillation orientation and subsequent beam pattern of the scan element 40. A mirror 9 is preferably bonded directly onto a second surface 10b of the permanent magnet 10, however, intermediate layers may be provided between the mirror 9 and the magnet 10 without departing from the spirit and scope of the invention. The elastomeric support 14 therefore supports the substrate 18, the magnet 10, and the mirror 9 on the bobbin 30.

As shown in FIG. 1, the bobbin 30, the elastomeric support 14, the substrate 18, the magnet 10, and the mirror 9 are all symmetrically oriented with respect to the central axis 32. That is, central axes (not shown) of the substrate 18, magnet 10, and mirror 9 are coaxially aligned. The central axis 32 preferably passes through both the center of mass and the geometric centers of the bobbin 30, substrate 18, magnet 10, and mirror 9. The geometric symmetry of the above-listed components imparts balance to the moving parts (i.e., the mirror 10, magnet 9, and elastomeric support 14), thereby rendering the scan element 40 substantially immune to droop induced by gravity or other inertial disruptions. In embodiments having more than one elastomeric support 14, the supports 14 are preferably also oriented symmetrically with respect to the central axis 32, but need not be coaxial therewith (e.g., the elastomeric supports 14 may each be symmetrically set a predetermined distance from the central axis 32).

Magnetic flux lines 11a, 11b are shown in FIG. 1 emanating from and returning to opposite poles of the magnet 10. Accordingly, opposite poles of magnet 10 are simultaneously attracted to and repelled from coil 12 when current is introduced into therein. As alternating current is introduced into the coil 12, a push-pull drive force exerted on the magnet 10 causes the mirror 9 to dither between the directions indicated by arrows 5, 6 and the directions indicated by arrows 7, 8. According to the preferred embodiment of the present invention, the mirror 9 rotates linearly through an angle in direct proportion to the current introduced into the coil 12. As a result of the configuration of the scan element 40, both poles of the magnet 10 are simultaneously under constant influence of current introduced into the coil 12. The scan element 40 is therefore highly efficient, particularly below resonance and does not require careful frequency tuning to avoid resonance sensitivities. Further, the elastomeric support 14 provides damping to the movement of the magnet 10 and mirror 9, minimizing unwanted ringing at the end points of the dithering motion when the scan element 40 is driven with a triangular wave form, for example.

Further control of the magnet 10 and mirror 9 may be achieved by winding a second coil (not shown) around the bobbin 30. The second coil may be used to obtain a current induced by the motion of the magnet 10 and incorporated into a feedback control circuit so that the amplitude of dithering is held constant, independent of temperature and aging effects. Further, detection of an induced current in the second coil is also useful for determining if the scan element 40 is malfunctioning so that the laser source may be powered off to protect a user from hazardous stray laser radiation that may be present if the beam ceases dithering.

In operation, a laser light source 1 emits a laser beam 2 toward the mirror 9. Preferably the laser beam 2 contacts the mirror close to the central axis 32, which is also the rotation axis. When the coil 12 is energized with alternating current, the magnet 10 and the mirror 9 dither, reflecting the laser beam 2 and producing a moving line scan beam 3 onto a barcode target 4.

When the scan element 40 includes only a single flexible support 14 in the center of flange 13, the scan element 40 may be utilized for two dimensional scanning. The support 14 preferably has an elliptical cross-sectional shape, such that it will exhibit different resonance frequencies in mutually orthogonal X and Y directions (both the X direction and Y direction being normal to the central axis 32 of FIG. 1 and to each other). The magnetization direction 31 of the magnet 10 may be rotated so that it is oriented between an X direction and Y direction. In such a configuration, when coil 12 is energized with a current having a waveform including two different frequencies, the magnet 10 will respond accordingly to generate a two dimensional scan pattern having components of motion in both X and Y directions. One such pattern that is very useful is a raster scan pattern which can rapidly cover a two dimensional barcode, such as a PDF 417, by scanning rapidly at a high frequency in one direction and slower in an orthogonal direction, in response to the lower frequency component of the drive waveform.

Figure 2:
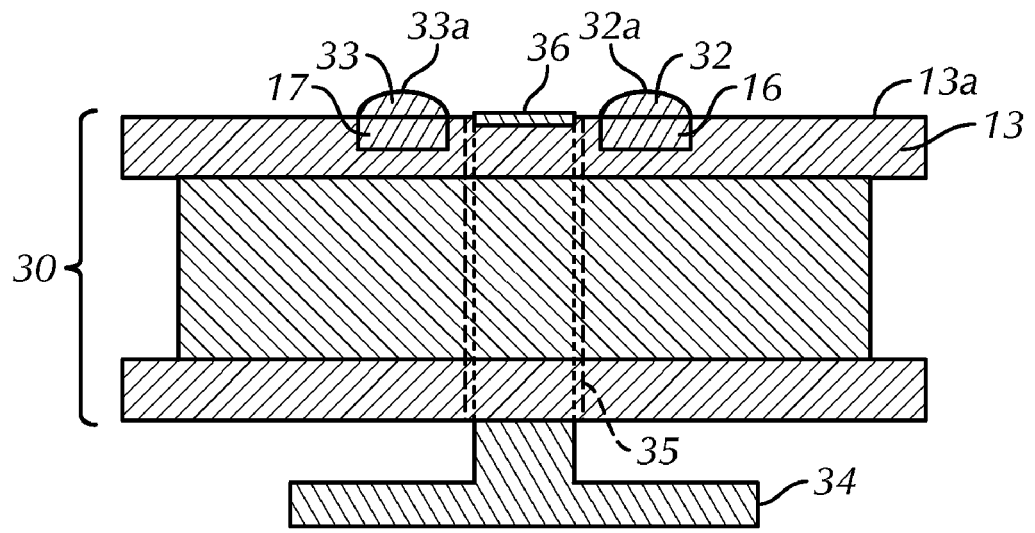
FIG. 2 is a side elevational cross-sectional view of a bobbin and push pin for forming the scan element of FIG. 1 in accordance with a preferred embodiment of the present invention.

Formation of the elastomeric supports 14 will now be described. Referring to FIG. 2, two pockets 16, 17 formed in the surface 13a of the flange 13 are shown. A predetermined amount of a molding material 32, 33, is placed into each pocket 16, 17 respectively. The molding material is preferably an elastomer, such as the silicone RTV resin described above. The droplets 32, 33 of the molding material are preferably of equal size, and are preferably dispensed with accurate volumetric control such that an exposed surface 32a, 33a of each of the droplets 32, 33 extends slightly above the surface 13a of the flange 13.

Figure 3:
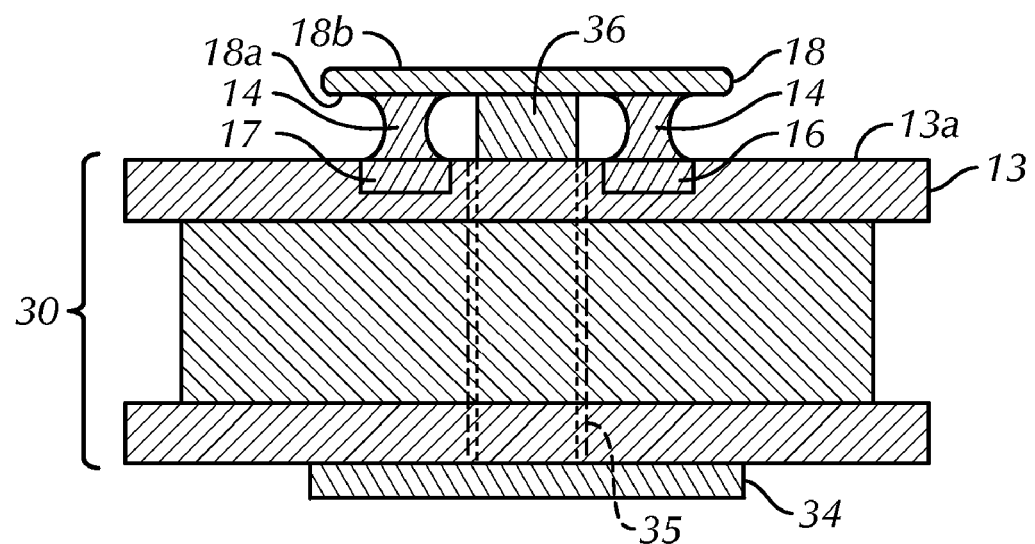
FIG. 3 is a side elevational cross-sectional view of the bobbin and push pin of FIG. 2 forming elastomeric supports.

Referring to FIG. 3, after the droplets 32, 33 are dispensed, the first surface 18a of the substrate 18 is placed in contact with the exposed surfaces 32a, 33a of the droplets 32, 33, wetting the first surface 18a of the substrate 18 with the molding material. Once the first surface 18a is wetted, the substrate 18 is separated from the flange 13 by a predetermined distance. Separation is preferably performed by placing a distal surface 36 of a generally T-shaped spacer pin 34 against the first surface 18a of the substrate 18, and pushing the substrate 18 until the bobbin 30 prevents further movement of the spacer pin 34. The spacer pin 34 passes through a bore 35 in the center of the bobbin 30. The elastomeric supports 14 naturally form the thin intermediate 14c portions due to adhesion of the first and second ends 14a, 14b to the flange 13 and the substrate 18, respectively, and surface tension of the molding material. The size and shape of the supports 14 depend upon the surface tension of the molding material, its viscosity, volume, and the distance that the spacer pin 34 raises the substrate 18.

Once supports 14 are formed, the magnet 10 and the mirror 9 may be sequentially placed and glued to the substrate 18. The silicone RTV resin typically takes several hours to fully cure and upon curing, the supports 14 achieve their final flexural properties and toughness.

The resonant frequency of the magnet 10 and mirror 9 of the scan element 40 is determined by the inertia of the components and the flexural characteristics of the elastomeric supports 14. By using different quantities or varieties of molding material and an appropriately sized spacer pin 34, different size mirrors 9, and magnets 10 of different sizes, the characteristic fundamental resonant frequency of scan element 40 is achieved.

Although the process described above has been described as having two supports 14, the process may be utilized to form one or more supports 14. It will be clear to one skilled in techniques of automated manufacturing that the assembly of scan element 40 as described above can be readily automated using robotic pick and place tools and precision liquid dispensing equipment.

Figure 4:
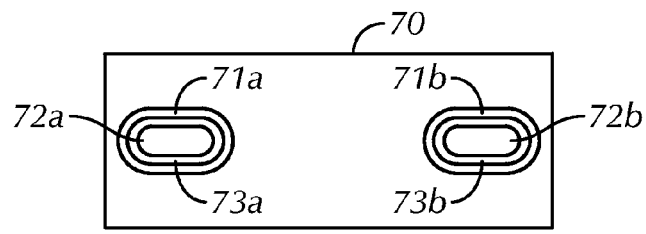
FIG. 4 is a top plan view of a substrate in accordance with a second embodiment of the present invention.

An alternate method of forming the elastomeric supports 14 will now be described. FIG. 4 shows a substrate 70, in accordance with a second embodiment of the invention, preferably formed from a non-magnetic material, such as phosphor bronze or beryllium copper alloy. Holes 72a and 72b are etched through the substrate 70. The holes 72a, 72b are preferably oblong in shape, but may be etched having other known shapes. Alternatively, the substrate 70 may be molded to form the holes 72a, 72b. Surrounding the holes 72a, 72b are respective first oblong shaped land areas 73a, 73b followed by partially etched second oblong areas 71a, 71b. The second oblong areas 71a, 71b are preferably etched half way through a thickness of the substrate 70.

Pockets 16, 17 formed in the surface 13a of the flange 13 (i.e., FIG. 1) are preferably shaped to match the holes 72a, 72b in the substrate 70. The pockets 16, 17 are filled evenly with liquid RTV silicone elastomeric compound. Once the pockets 16, 17 are filled, substrate 70 is placed on the flange 13 so that holes 72a, 72b overlay the pockets 16, 17, after which a second predetermined quantity of additional liquid silicone elastomeric compound is added to atop the holes 72a, 72b. The silicone fuses to the liquid elastomeric compound in the pockets 16, 17 and simultaneously flows over and wets the first land areas 73a, 73b. The silicone does not flow into the partly etched areas 71a, 71b. In this manner, the volume of silicone RTV is confined and controlled.

Following the placement of silicone atop the holes 72a, 72b, substrate 70 is pushed up and away by a predetermined distance from the flange 13, preferably by the pin 34 described above, thereby forming the two substantially equal elongated elastomeric supports 14. When the elastomeric supports 14 cure, they become flexible and a magnet 10 and mirror 9 are sequentially added as previously described to form the scan element 40. The oblong shape described above enables flexing at a low resonance frequency about a direction generally perpendicular or transverse to a line between the centers of the supports 14, yet strongly resists flexing in the direction between the centers, thereby enabling the production of straight non-split scan lines.

Figure 5:
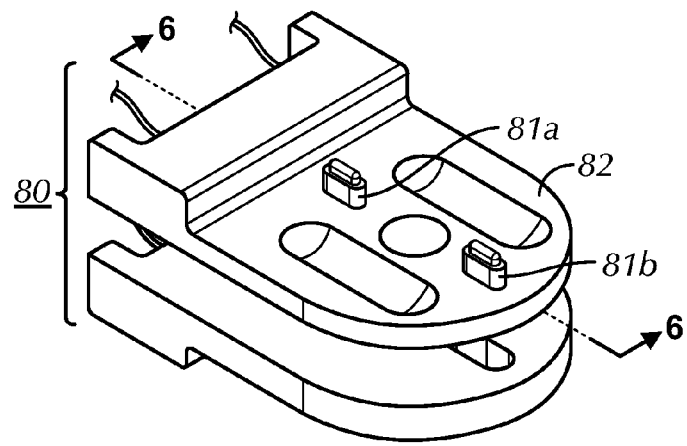
FIG. 5 is a perspective view of a bobbin and supports in accordance with a third embodiment of the present invention.
Figure 6:
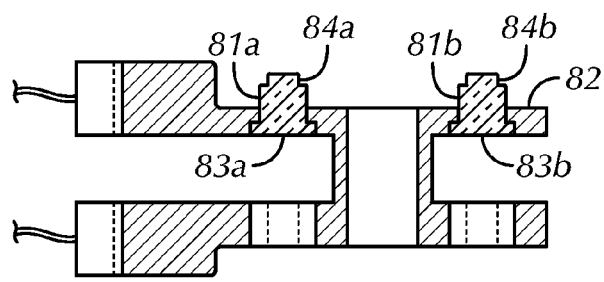
FIG. 6 is a side elevational cross-sectional view of the bobbin and supports of FIG. 5 taken along line 5-5 of FIG. 5.

FIG. 5 illustrates a third embodiment of the present invention wherein a bobbin 80, preferably formed of molded plastic, includes two molded flexible inserts 81a, 81b preferably formed of injection molded silicone rubber. FIG. 6 shows a cross-sectional view of the bobbin 80 with a flange 82. Molded inserts 81a, 81b each preferably include a shoulder 83a, 83b that anchors the respective inserts 81a, 81b into the bobbin flange 82. Atop the inserts 81a, 81b are further mounting ribs 84a, 84b, which may be shaped, for example, to fit the holes 72a, 72b of the mounting substrate 70 in FIG. 4. Mounting features 84a, 84b are preferably secured to the holes 72a, 72b using liquid adhesive (such as liquid silicone RTV resin), but may also be secured by a mechanical lock fitting or the like.

Figure 7:
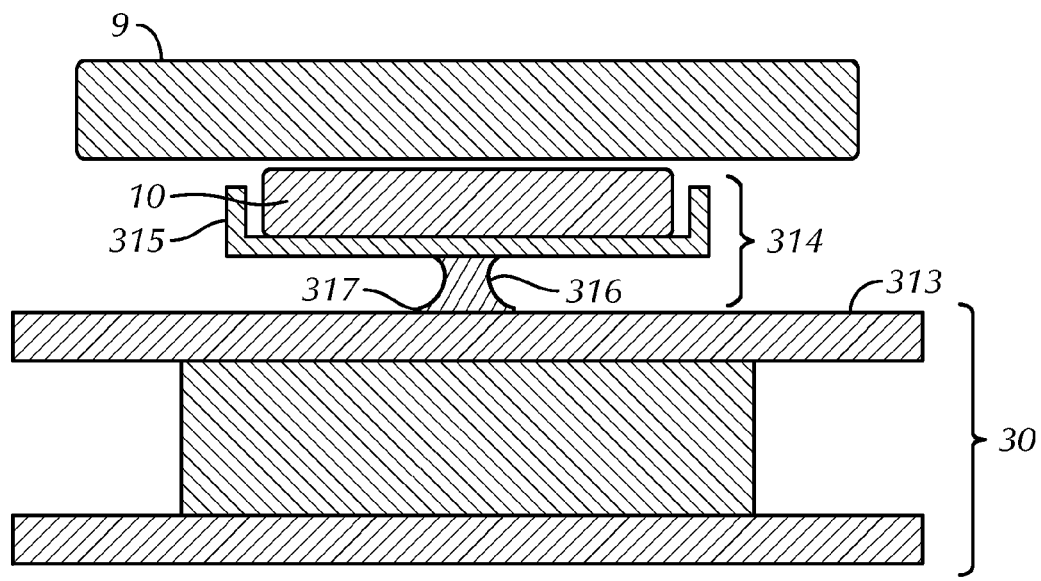
FIG. 7 is a side elevational cross-sectional view of a scan element in accordance with a fourth embodiment of the present invention.

FIG. 7 shows a fourth embodiment of the present invention wherein an elastomeric support 314 is shaped to hold the magnet 10 within a pocket 315 integrally formed as part of the support 314. A middle portion 316 of the support 314 flexes as described above in other embodiments, and a base portion 317 of the support 314 may be attached to a flange 313 of the bobbin 30 using anchoring methods described above.

In a preferred embodiment, the base portion 317 of the elastomeric support 314 is molded into bobbin flange 313 to firmly anchor the support 314, thereby creating a high immunity to detachment damage resulting from drops or the like. Molded insert 81a and shoulder 83a (FIG. 6) show an exemplary form of anchoring. The magnet 10 is preferably glued into the pocket 315, but may also be mechanically pressed or locked into the pocket 315. If the elastomeric support 314 is molded from silicone rubber, then the magnet 10 may be glued using liquid RTV silicone to form an exceptionally strong bond. The support 314 may be a single support as described in earlier embodiments, or may include two or more supports attached to the pocket 315 and the bobbin flange 313.

Figure 8A:
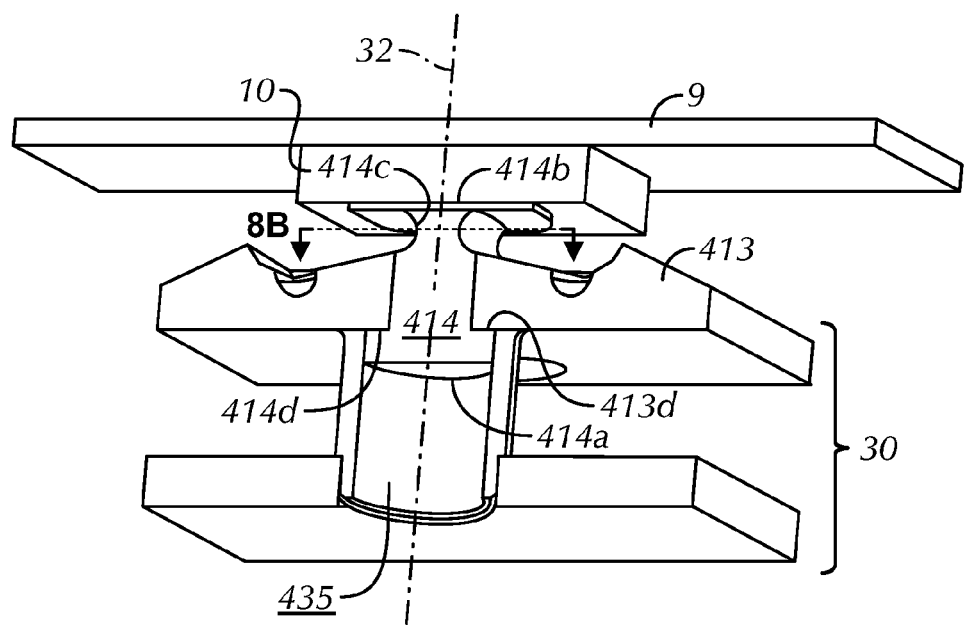
FIG. 8A is a perspective cross-sectional view of a scan element in accordance with a fifth embodiment of the present invention.

FIG. 8A illustrates a fifth embodiment of the present invention. A first end 414a of an elastomeric support 414 is preferably disposed within a bore 435 of the bobbin 30 with a mating collar 414d of the elastomeric support 414 and a mating collar 413d of flange 413 being coupled to prevent the elastomeric support 414 from being removed axially from the bobbin 30. A second end 414b of the elastomeric support 414b is attached to the magnet 10. The second end 414b preferably is broad to support the weight of the magnet 10 and mirror 9, but may also be shaped as desired. The elastomeric support 414 is preferably formed and attached to the magnet 10 and bobbin 30 by injection molding, but may be bonded or mechanically attached as described above for other embodiments. An intermediate portion 414c is preferably smaller in cross-section than the first and second ends 414a, 414b.

Figure 8B:
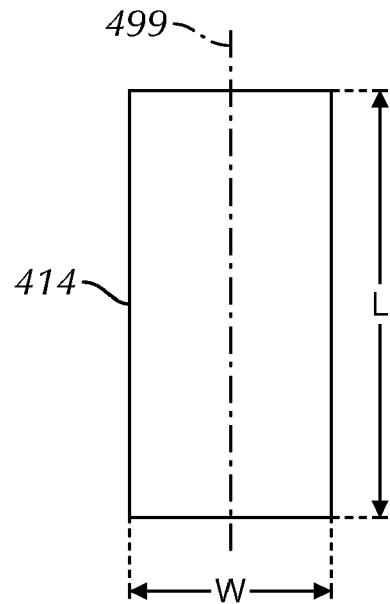
FIG. 8B is a cross-section of an elastomeric support of the scan element of FIG. 8A.

FIG. 8B shows a cross-section of the elastomeric support 414 taken perpendicular to the central axis 32 (FIG. 8A). Preferably, at least one such cross-section has a length L parallel to an axis of rotation 499 of the mirror 9 and the magnet 10 that is larger than a width W that is perpendicular to the length L.

Figure 9:
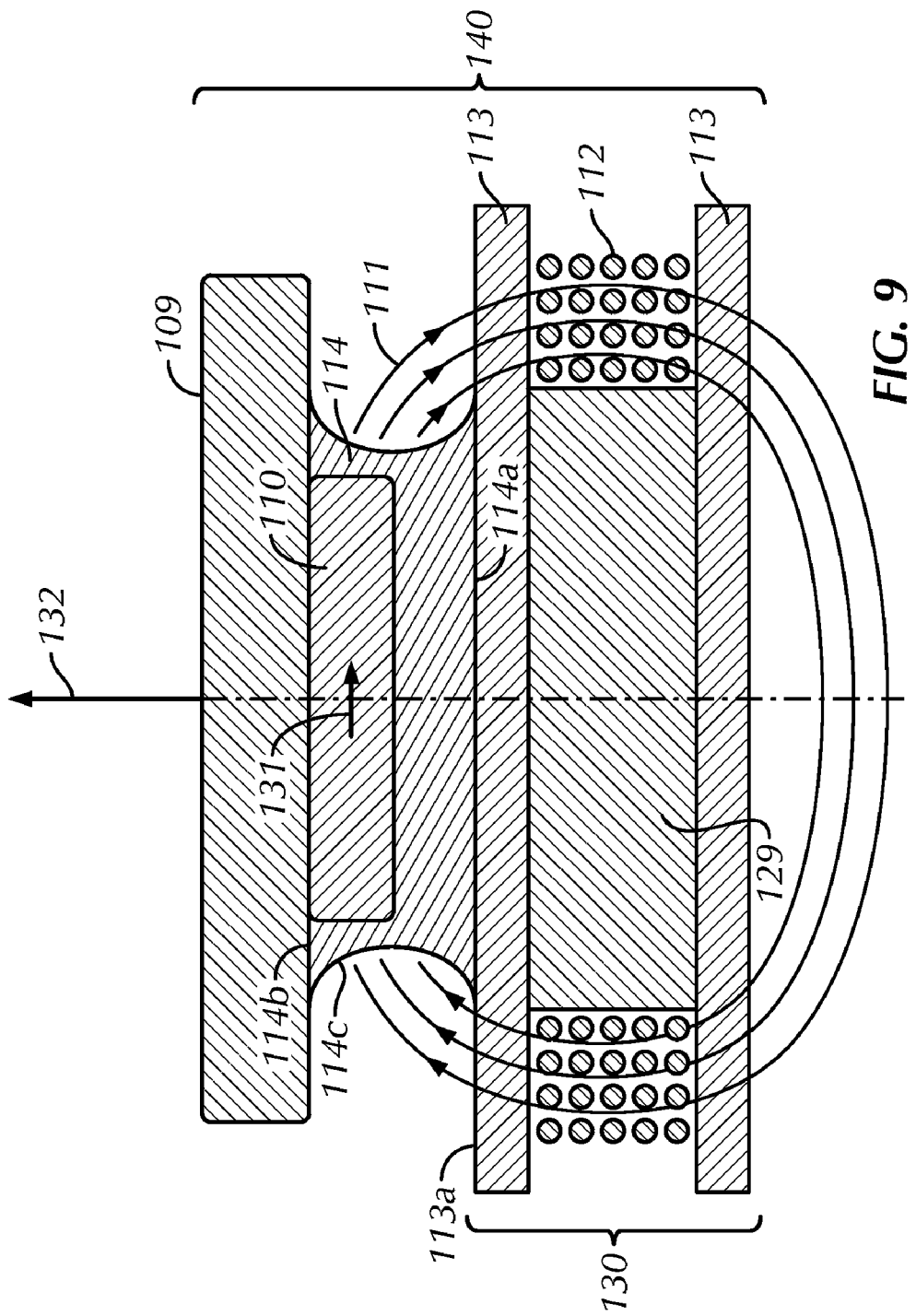
FIG. 9 is a side elevational cross-sectional view of a scan element in accordance with a sixth embodiment of the present invention.

FIG. 9 illustrates a sixth embodiment of the present invention. A scan element 140 includes a bobbin 130 with flanges 113, which may be similar to the bobbin 30 described above in the embodiment of FIG. 1. One of the flanges 113 includes a generally flat upper surface 113a to which is coupled a first end 114a of an elastomeric support 114. As before, the elastomeric support 114 is preferably made from silicone RTV. The elastomeric support 114 may be formed by patterning and hardening molding material to the desired shape. The first end 114a of the elastomeric support 114 is subsequently adhered to the flat surface 113a of the flange 113 by suitable adhesives, bonding, or the like. Alternatively, the molding material may be patterned into the desired shape and a predetermined amount of molding material may be brought into contact with the surface 113a of the flange 113 prior to hardening. In this way, the elastomeric support 114 is bonded to the surface 113a of the flange 113 as described above with respect to the embodiment of FIG. 1.

The elastomeric support 114 is preferably a rectangle in cross section, but may take the form of other shapes, such as that of a circle, an oval, or the like. The width and thickness of the elastomeric support 114 can be varied based on the desired oscillation frequency desired. An intermediate portion 114c is preferably smaller in cross-sectional area than the first and second ends 114a, 114b. The cross-sectional shape of the elastomeric support 114 is preferably designed to produce a spring-mass system with a natural frequency generally equal to the desired drive frequency.

A magnet 110 is embedded within the elastomeric support 114 adjacent a second end 114b opposite to the first end 114a. The magnet 110 is preferably placed into the molding material during the patterning and hardening process to form the elastomeric support 114. However, the magnet 110 may also be inserted into a molded cavity (not shown) within the elastomeric support, a cavity (not shown) formed by removal of material from the elastomeric support 114, or the like. The magnetization direction 131 of the magnet 110 is preferably generally transverse to a central axis 132 of the bobbin 130, with which a central axis (not shown) of the magnet 110 is coaxially aligned.

A mirror 109, with its reflective side facing away from the bobbin 130, is mounted to the second end 114b of the elastomeric support 114. The attachment to the mirror 109 is preferably performed by curing-in-place the molding material as described above with respect to the flange 113 and the magnet 110. However, suitable adhesives or other attachment methods may be used. The mirror 109 is preferably also glued or adhered to the magnet 110, but the magnet 110 need not be attached to the mirror 109 at all and may be entirely surrounded within the elastomeric support 114. Similar to the embodiment shown in FIG. 1, central axes of the mirror 109, magnet 110, and elastomeric support 114 are all coaxially aligned with the central axis 132 of the bobbin 130.

Upon energization of a coil 112 wound about the bobbin 130, as described above the magnet 110 will dither depending upon the orientation of the magnetization direction 131 with respect to a magnetic field 111 generated by the energized coil 112. Thus, the scan element 140 can enjoy two degrees of rotational freedom based on such orientation. This particular embodiment employs a single point of contact, that is, the elastomeric support 114 only contacts the mirror 109 in one area, rather than at two points defining a hinge, allowing the multiple-axis actuation of the scan element 140. A scan element 140 having two degrees of freedom may incorporate a second coil (not shown) to control motion in the second axis. Additional magnets with additional orientations may be encapsulated in the elastomeric support 114. Further, other materials or voids in the elastomeric support 114 may be included to change characteristics of motion. For example, allowing the elastomeric support 114 to buckle, rather than follow simple elastic or non-elastic force curves, is contemplated.

Figure 10:
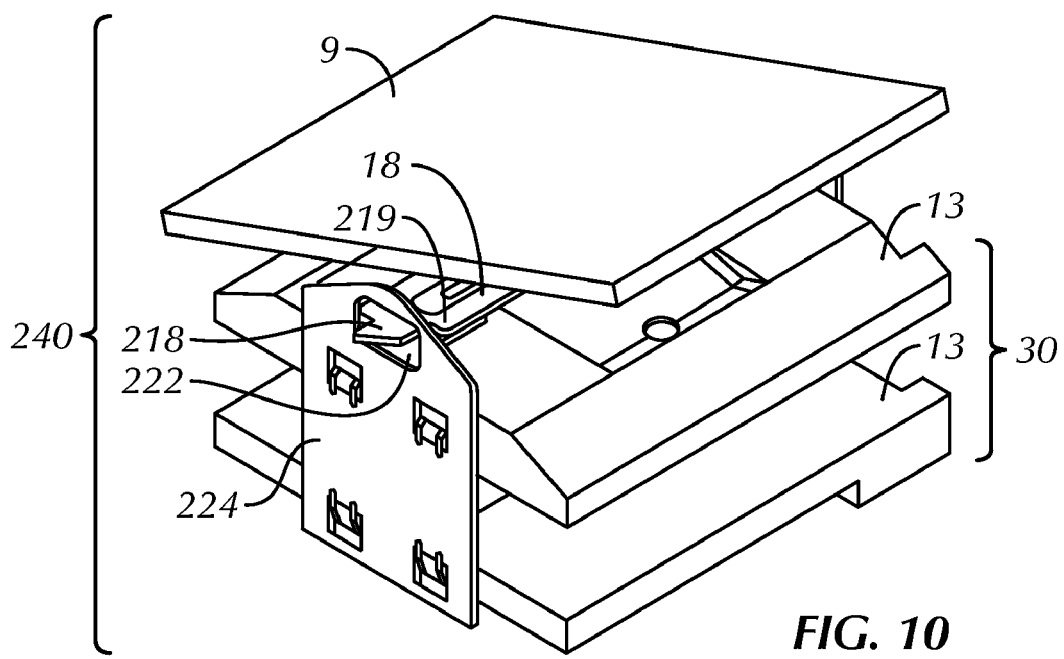
FIG. 10 is a perspective view of a scan element in accordance with preferred embodiments of the present invention mounted within a shock protection apparatus.

In hand-held scanning applications, users occasionally subject the scanner to impact, such as hammering the scanner on a counter after an unsuccessful barcode reading. This imparts great shock to the scan element and severe damage may result. To further protect the scan element in accordance with embodiments of the present invention, mechanical limit protection may be included in its design to prevent overstressing of the elastomeric supports. FIG. 10 illustrates one example wherein a limit plate 224 is attached to one or both flanges 13 of the bobbin 30. The limiting plates 224 may be made of metal or plastic. An opening 222 is included in the limiting plate 224 and restricts the movement of an extension 218 of a substrate 18 (such as substrate 18 in FIG. 1 to which the mirror 9 and magnet 10 are mounted). In normal operation, the mirror 9, magnet 10 (not shown in FIG. 10) and substrate 18 will dither without touching the perimeter of opening 222, but when subjected to excessive shock along any axis, movement of the extension 218 of the substrate 18 is limited by the size of the opening 222 and further movement is thereby prevented, reducing the possibility of damage. The bobbin 30 may also include motion limiting protection parts (not shown) similar to limiting plates 224 and substrate 18 in order to entirely limit destructive motion of the scan element.

It will be appreciated by those skilled in the art that changes could be made to the embodiments described above without departing from the broad inventive concept thereof. It is understood, therefore, that the invention is not limited to the particular embodiments disclosed, but it is intended to cover modifications within the spirit and scope of the present invention as defined by the appended claims.

I claim:

1. A scan element for use in scanning a light beam produced from a light source, said scan element comprising:
   a bobbin having a central axis about which is wound an energizable electromagnetic wire coil;
   at least one elastomeric support having first and second ends,
   wherein said first end is supported so that said second end is disposed at a predetermined distance from said bobbin, about which said energizable electromagnetic wire coil is wound;
   a permanent magnet having first and second sides, a central axis, and a magnetization direction;
   wherein said first side of said permanent magnet is supported by the second end of said at least one elastomeric support;
   wherein the magnetization direction of said permanent magnet is oriented generally transverse to the central axis of said permanent magnet;
   a mirror having a central axis and being mounted on the second side of said permanent magnet to form a scanning subassembly;
   wherein the central axis of said mirror is generally coaxial with the central axis of said permanent magnet;
   wherein said at least one elastomeric support has an intermediate portion between said first and second ends, and wherein said intermediate portion has a cross-sectional area smaller than a cross-sectional area of said first and second ends; and
   wherein said at least one elastomeric support generating a return force when said permanent magnet and said mirror are rotated at an angle relative to the central axis of said bobbin, during energization of said electromagnetic wire coil.

2. The scan element of claim 1, wherein said at least one elastomeric support is formed from one of a silicone room temperature vulcanization (RTV) resin and an injection moldable silicone rubber.

3. The scan element of claim 1, wherein said at least one elastomeric support has a cross-section of one of a rectangle, a circle and an ellipse.

4. The scan element of claim 1, wherein said bobbin is made from a plastic material.

5. The scan element of claim 1, wherein said at least one elastomeric support is a molded article made from an elastomeric material.

6. The scan element of claim 1, wherein said at least one elastomeric support comprises a pair of spaced apart support elements.

7. The scan element of claim 1, wherein said at least one elastomeric support has width dimensions and thickness dimensions selected to achieve a desired frequency of oscillation for said scanning subassembly.

8. A scan element for use in scanning a light beam produced from a light source, said scan element comprising:
   a bobbin having a central axis about which is wound an energizable electromagnetic wire coil, for generating a magnetic force field in the vicinity of said scan element in response to electrical current introduced through said energizable electromagnetic wire coil;
   an elastomeric support having first and second ends extending along a central axis, and molded from an elastomeric material;
   wherein said elastomeric support has an intermediate portion with a cross-sectional area, and extending between said first and second ends;
   wherein the first and second ends of said elastomeric support have a cross-sectional area; and
   wherein the cross-sectional area of said intermediate portion is smaller than the cross-sectional area of said first and second ends of said elastomeric support;
   a mirror having a central axis and being mounted on the second end of said at least one elastomeric support; and a permanent magnet having a central axis and being mounted relative to said mirror and said elastomeric support, so that said permanent magnet, said mirror and said elastomeric support form a scanning subassembly;

wherein the central axis of said mirror is generally co-axially aligned with the central axis of said elastomeric support;

wherein said first end of said elastomeric support is supported relative to said bobbin so that said permanent magnet is disposed at a distance from said energizable electromagnetic wire coil allowing said permanent magnet to interact with said magnetic force field generated by said energizable electromagnetic wire coil when electrical current is introduced through said energizable electromagnetic wire coil; and wherein, when electrical current is introduced through said energizable electromagnetic wire coil, said energizable electromagnetic wire coil generates said magnetic force field causing said scanning assembly to rotate at an angle relative to the central axis of said bobbin, while said elastomeric support generates a return force when said scanning assembly is rotated at said angle relative to the central axis of said bobbin.

9. The scan element of claim 8, wherein said elastomeric support has width dimensions and thickness dimensions selected to achieve a desired frequency of oscillation for said scanning subassembly.

10. The scan element of claim 8, wherein said permanent magnet is mounted adjacent to said mirror mounted so that the central axis of said permanent magnet is generally co-axially aligned with the central axis of said mirror; wherein said first end of said elastomeric support is mounted to said bobbin; and wherein the central axis of said mirror is generally coaxially aligned with the central axes of said bobbin and said permanent magnet.

11. The scan element of claim 8, wherein said elastomeric support is formed from one of a silicone room temperature vulcanization (RTV) resin and an injection moldable silicone rubber.

12. The scan element of claim 8, wherein said elastomeric support has a cross-section of one of a rectangle, a circle and an ellipse.

13. The scan element of claim 8, wherein said bobbin is made from a plastic material.

14. A scan element for use in scanning a light beam produced from a light source, said scan element comprising:

a bobbin having a central axis about which is wound an energizable electromagnetic wire coil, for generating a magnetic force field in the vicinity of said scan element in response to electrical current introduced through said energizable electromagnetic wire coil;

an elastomeric support structure including a pair of spaced apart support elements, each said support element having first and second ends extending along a central axis, and molded from an elastomeric material;

wherein each said support element has an intermediate portion with a cross-sectional area, and extending between said first and second ends;

wherein the first and second ends of each said support element have a cross-sectional area; and wherein the cross-sectional area of said intermediate portion is smaller than the cross-sectional area of said first and second ends of said support element;

a mirror having a central axis and being mounted on the second ends of said support elements; and a permanent magnet having a central axis and being mounted relative to said mirror and said elastomeric support structure, so that said permanent magnet, said mirror and said elastomeric support structure form a scanning subassembly;

wherein the central axis of said mirror is generally parallel with the central axes of said support elements;

wherein said first ends of said support elements are supported relative to said bobbin so that said permanent magnet is disposed at a distance from said energizable electromagnetic wire coil allowing said permanent magnet to interact with said magnetic force field generated by said energizable electromagnetic wire coil when electrical current is introduced through said energizable electromagnetic wire coil; and wherein, when electrical current is introduced through said energizable electromagnetic wire coil, said energizable electromagnetic wire coil generates said magnetic force field causing said scanning assembly to rotate at an angle relative to the central axis of said bobbin, while said elastomeric support structure generates a return force when said scanning assembly is rotated at said angle relative to the central axis of said bobbin.

15. The scan element of claim 14, wherein each said support element has width dimensions and thickness dimensions selected to achieve a desired frequency of oscillation for said scanning subassembly.

16. The scan element of claim 14, wherein said permanent magnet is mounted adjacent to said mirror mounted so that the central axis of said permanent magnet is generally co-axially aligned with the central axis of said mirror; wherein said first end of each said support element is mounted to said bobbin; and wherein the central axis of said mirror is generally coaxially aligned with the central axes of said bobbin and said permanent magnet.

17. The scan element of claim 14, wherein said elastomeric support structure is formed from one of a silicone room temperature vulcanization (RTV) resin and an injection moldable silicone rubber.

18. The scan element of claim 14, wherein each said support element has a cross-section of one of a rectangle, a circle and an ellipse.

19. The scan element of claim 14, wherein said bobbin is made from a plastic material.

* * * * *